US012022883B2

(12) United States Patent
Jung et al.

(10) Patent No.: US 12,022,883 B2
(45) Date of Patent: Jul. 2, 2024

(54) AEROSOL-GENERATING DEVICE AND PREHEATING METHOD THEREOF

(71) Applicant: KT&G CORPORATION, Daejeon (KR)

(72) Inventors: Hyung Jin Jung, Seoul (KR); Tae Hun Kim, Yongin-si (KR); Hun Il Lim, Seoul (KR); Jae Sung Choi, Seoul (KR); Jung Ho Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 567 days.

(21) Appl. No.: 17/291,152

(22) PCT Filed: Oct. 12, 2020

(86) PCT No.: PCT/KR2020/013842

§ 371 (c)(1),
(2) Date: May 4, 2021

(87) PCT Pub. No.: WO2021/075805

PCT Pub. Date: Apr. 22, 2021

(65) Prior Publication Data

US 2022/0071301 A1 Mar. 10, 2022

(30) Foreign Application Priority Data

Oct. 17, 2019 (KR) ........................ 10-2019-0129336

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/20* (2020.01); *A24F 40/30* (2020.01);
(Continued)

(58) Field of Classification Search
CPC .......... A24F 40/57; A24F 40/53; A24F 40/46; A24F 40/51; A24F 40/30; A24F 40/20;
(Continued)

(56) References Cited

U.S. PATENT DOCUMENTS 9,067,029 B2 6/2015 Yamada et al.
9,498,000 B2 11/2016 Kuczaj
(Continued)

FOREIGN PATENT DOCUMENTS

CN 108402521 A 8/2018
CN 208192125 U 12/2018
(Continued)

OTHER PUBLICATIONS

Extended European Search Report dated Apr. 28, 2022 in European Application No. 20877646.8.
(Continued)

*Primary Examiner* — Khiem M Nguyen
(74) *Attorney, Agent, or Firm* — Sughrue Mion, PLLC

(57) ABSTRACT

An aerosol-generating device may include a first heater for generating a first aerosol and a second heater for heating a second aerosol-generating substrate, and may significantly increase the initial atomization amount of the aerosol generating device by heating the second heater based on a preheating time of the first heater in a preheating section for increasing the temperatures of the first heater and the second heater.

15 Claims, 6 Drawing Sheets

(51) Int. Cl.

| | |
|---|---|
| ***A24F 40/20*** | (2020.01) |
| ***A24F 40/30*** | (2020.01) |
| ***A24F 40/46*** | (2020.01) |
| ***A24F 40/51*** | (2020.01) |
| ***A24F 40/53*** | (2020.01) |
| ***H05B 1/02*** | (2006.01) |

(52) U.S. Cl.
CPC .............. *A24F 40/46* (2020.01); *A24F 40/51* (2020.01); *A24F 40/53* (2020.01); *H05B 1/0244* (2013.01); *H05B 2203/005* (2013.01)

(58) Field of Classification Search
CPC .. A24F 40/10; H05B 1/0244; H05B 2203/005
USPC .......................................................... 131/329
See application file for complete search history.

(56) References Cited

U.S. PATENT DOCUMENTS

| | | | |
|---|---|---|---|
| 9,609,894 | B2 | 4/2017 | Abramov et al. |
| 9,668,521 | B2 | 6/2017 | Kuczaj |
| 9,949,507 | B2 | 4/2018 | Flick |
| 10,136,673 | B2 | 11/2018 | Mironov |
| 10,333,330 | B2 | 6/2019 | Holzherr |
| 11,337,464 | B2 | 5/2022 | Lee et al. |
| 2016/0331033 | A1 | 11/2016 | Hopps et al. |
| 2018/0084608 | A1 | 3/2018 | Bernauer et al. |
| 2019/0098927 | A1 | 4/2019 | Mironov |
| 2019/0274353 | A1 | 9/2019 | Sur |
| 2020/0093185 | A1 | 3/2020 | Lim |
| 2020/0359688 | A1 | 11/2020 | Jang et al. |
| 2020/0368462 | A1 | 11/2020 | Lee et al. |
| 2021/0068460 | A1 | 3/2021 | Egoyants et al. |
| 2021/0106051 | A1 | 4/2021 | Han et al. |
| 2021/0401048 | A1 | 12/2021 | Egoyants et al. |
| 2022/0087311 | A1 | 3/2022 | Han et al. |

FOREIGN PATENT DOCUMENTS

| | | | |
|---|---|---|---|
| EP | 0 430 559 | A2 | 6/1991 |
| EP | 3 603 426 | A1 | 2/2020 |
| EP | 3 965 531 | A1 | 3/2022 |
| JP | 2014-530632 | A | 11/2014 |
| JP | 2015-524260 | A | 8/2015 |
| JP | 2017-511123 | A | 4/2017 |
| KR | 10-1076144 | B1 | 10/2011 |
| KR | 10-2014-0070588 | A | 6/2014 |
| KR | 10-2015-0102924 | A | 9/2015 |
| KR | 10-2016-0147253 | A | 12/2016 |
| KR | 10-1793802 | B1 | 11/2017 |
| KR | 10-1872334 | B1 | 6/2018 |
| KR | 10-2018-0111460 | A | 10/2018 |
| KR | 10-2019-0093027 | A | 8/2019 |
| WO | 2018/182322 | A1 | 10/2018 |
| WO | 2018/201426 | A1 | 11/2018 |
| WO | 2018/217030 | A1 | 11/2018 |
| WO | 2018216961 | A1 | 11/2018 |
| WO | 2019/105879 | A1 | 6/2019 |
| WO | 2019/122344 | A1 | 6/2019 |
| WO | 2020/101206 | A1 | 5/2020 |
| WO | 2020/222530 | A1 | 11/2020 |

OTHER PUBLICATIONS

Chinese Office Action dated Mar. 17, 2023 in Chinese Application No. 202080007013.5.
Japanese Office Action dated Jan. 31, 2023 in Japanese Application No. 2021-540116.
International Search Report for PCT/KR2020/013842 dated Mar. 9, 2021 [PCT/ISA/210].
Written Opinion for PCT/KR2020/013842 dated Mar. 9, 2021 [PCT/ISA/237].
Korean Office Action for 10-2019-0129336 dated Oct. 17, 2019.
Office Action dated Aug. 23, 2022 issued by the Japanese Patent Office in Japanese Application No. 2021-540116.

【Figure 1】
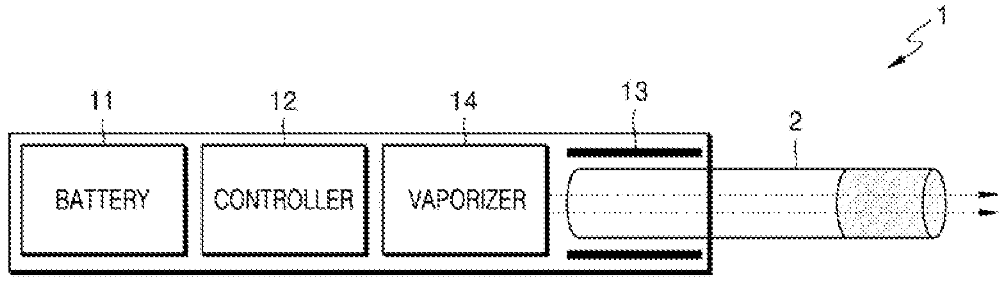
【Figure 2】
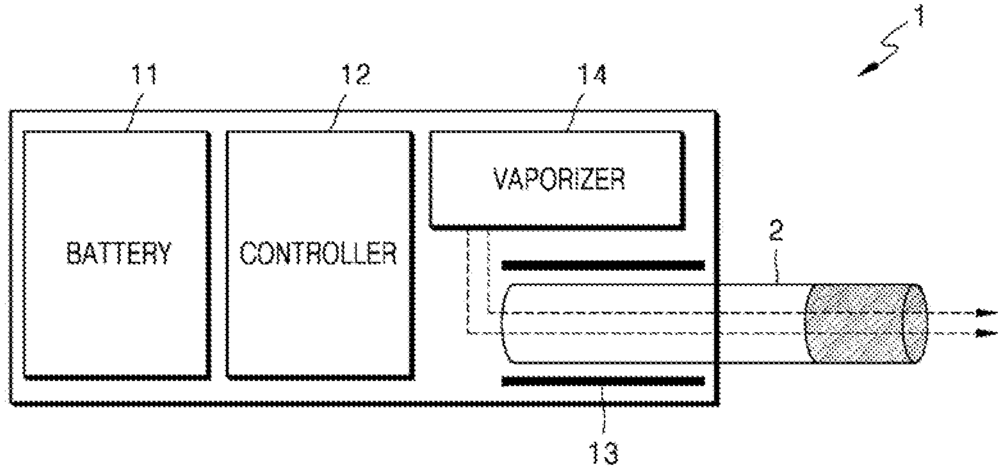
【Figure 3】
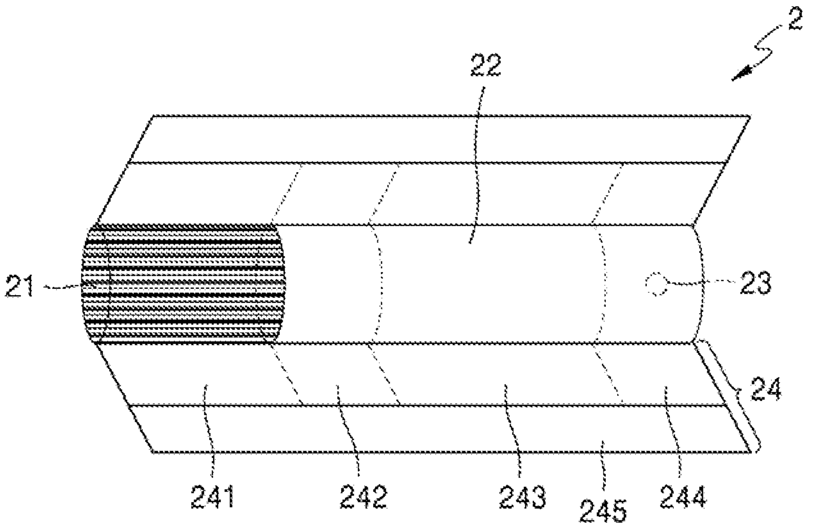

【Figure 4】
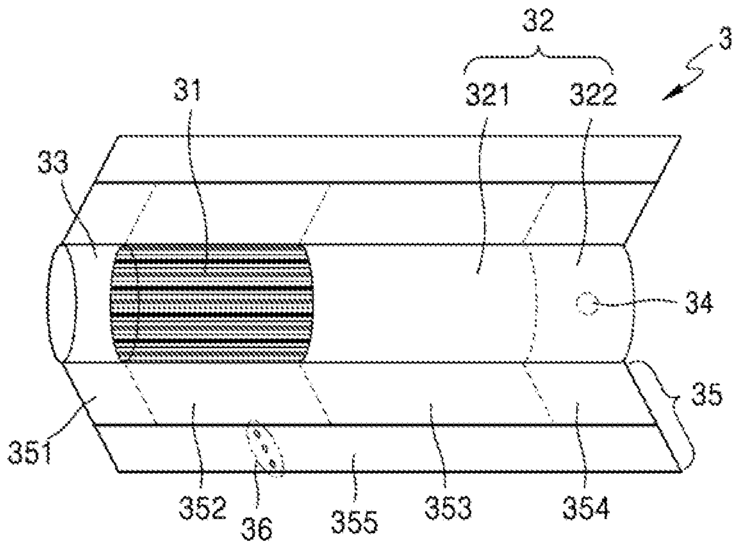
【Figure 5】
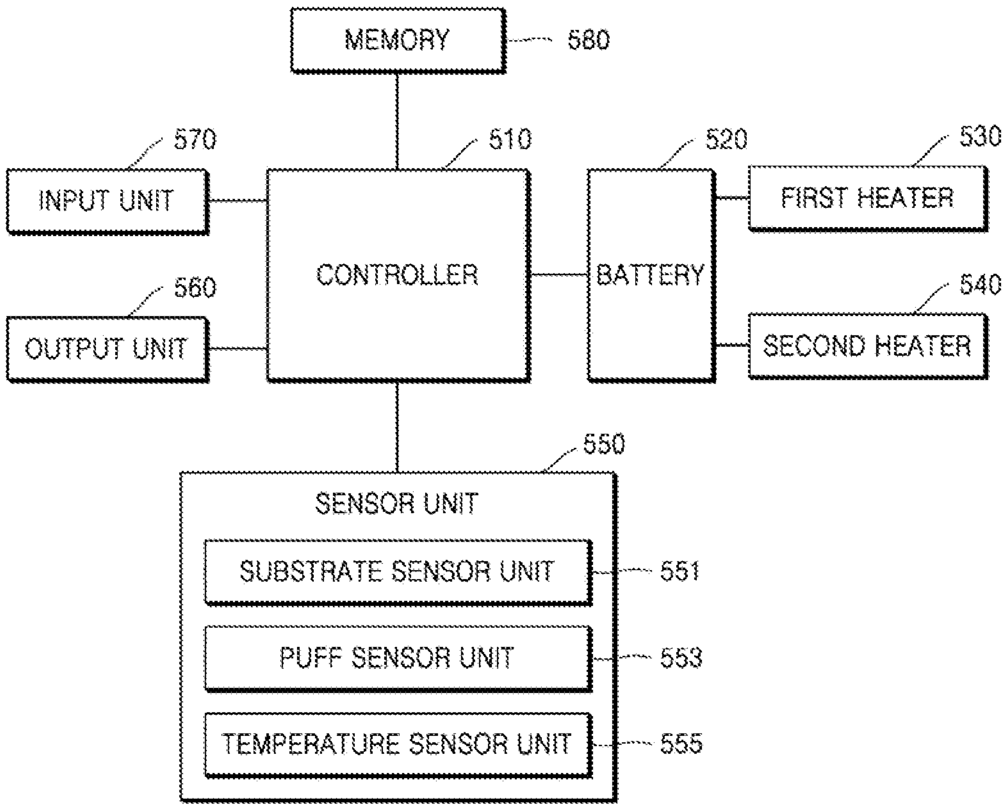

【Figure 6】
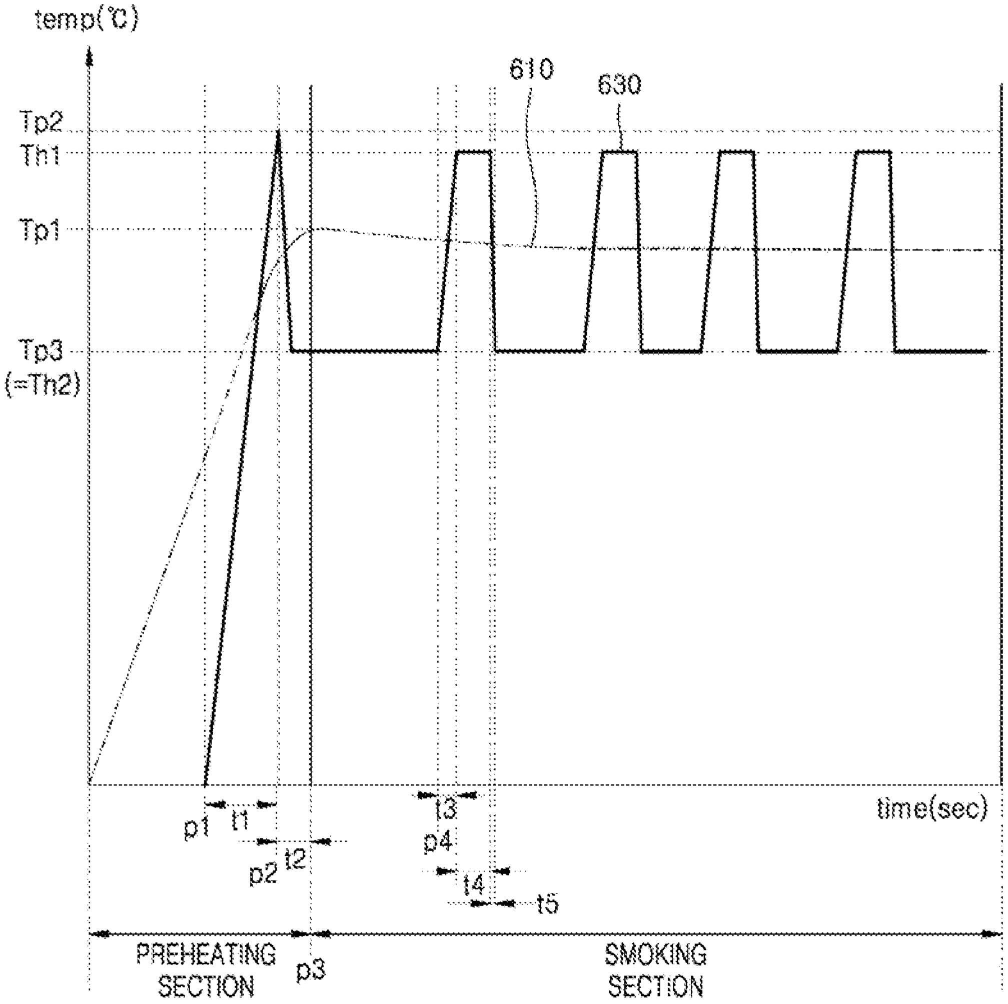

【Figure 7】
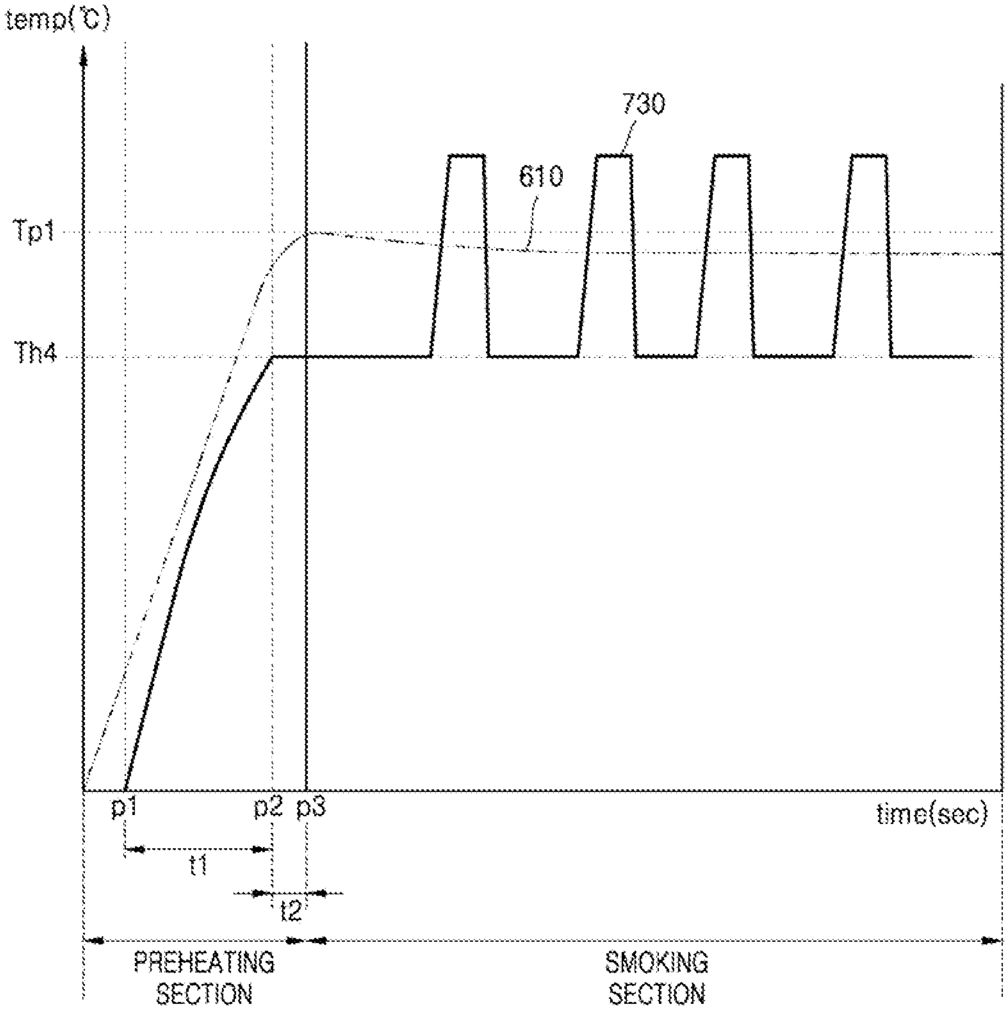

【Figure 8】
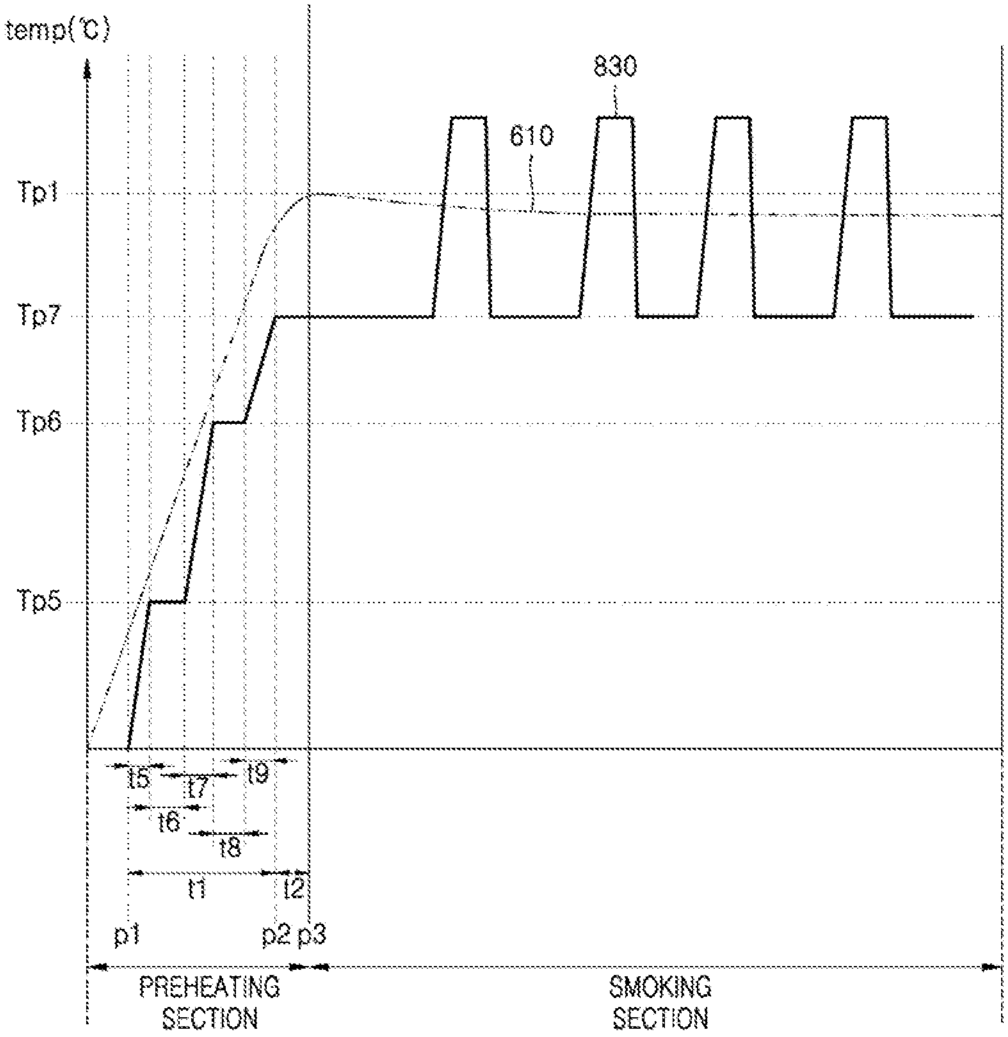

【Figure 9】
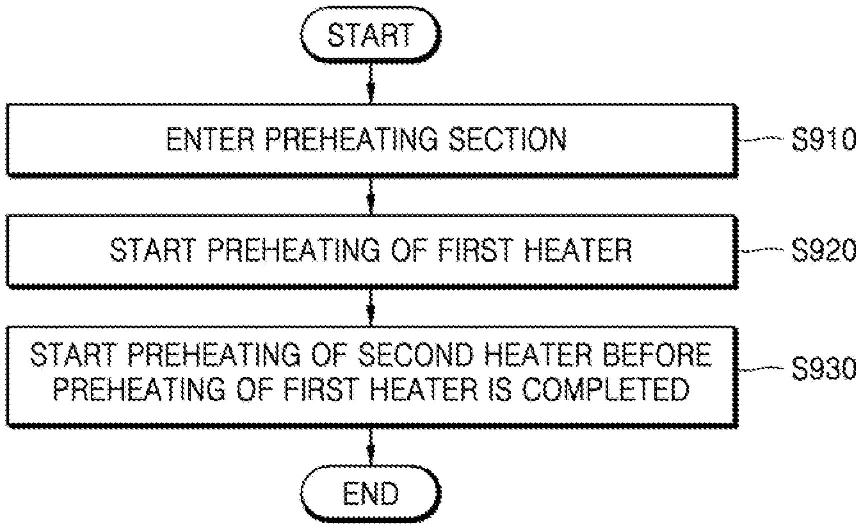

AEROSOL-GENERATING DEVICE AND PREHEATING METHOD THEREOF

TECHNICAL FIELD

The present invention relates to an aerosol-generating device and a preheating method thereof, and more particularly, to an aerosol-generating device capable of increasing an amount of aerosol atomized at the beginning of smoking on the aerosol-generating device, and a preheating method thereof.

BACKGROUND ART

Recently, demand for an alternative to traditional cigarettes has increased. For example, there is growing demand for an aerosol-generating device that generates an aerosol by heating an aerosol-generating material in cigarettes or liquid storages rather than by combusting cigarettes.

Such an aerosol-generating device is designed to generate an aerosol by heating a heater according to a user's input, but when a temperature of the heater is not precisely controlled, the amount of atomization generated cannot satisfy the user's expectation.

In particular, in an aerosol-generating device designed to generate mixed aerosols by heating a plurality of aerosol-generating substrates, when any one of the aerosol-generating substrates is liquid, there is a problem that an amount of aerosol atomized is significantly small at the beginning of smoking compared to the later part of smoking, due to high liquid viscosity.

DISCLOSURE

Technical Problem

The technical problem to be solved by the present invention is, in an aerosol-generating device that simultaneously heats a cigarette and a liquid composition, to provide an aerosol-generating device capable of increasing an amount of aerosol atomized at the beginning of the smoking section by preheating a first heater for heating a cigarette and a second heater for heating a liquid composition before a smoking section, and a preheating method thereof.

Another technical problem to be solved by the present invention is to provide an aerosol-generating device capable of reducing power consumption of a second heater by heating the second heater for heating a liquid composition based on a preheating time of a first heater, and a preheating method thereof.

The technical problems of the present disclosure are not limited to the above-described description, and other technical problems may be derived from the embodiments to be described hereinafter.

Advantageous Effects

An aerosol-generating device and a preheating method thereof according to the present invention may increase an amount of aerosol atomized at the beginning of the smoking section by preheating a first heater and a second heater before a smoking section.

In addition, the aerosol-generating device and the preheating method thereof can significantly reduce the total power consumption of the aerosol-generating device, by setting a preheating time of the second heater heating a liquid substrate to be shorter than a preheating time of the first heater heating a solid substrate.

In addition, the aerosol-generating device and the preheating method thereof can prevent a heater coil from being carbonized by not reheating the liquid substrate even if a user's puff is detected after the liquid substrate preheated in a preheating section.

In addition, the aerosol-generating device and the preheating method thereof can prevent carbonization of the heater coil, thereby preventing phenomena such as deterioration of smoking taste and reduction of atomization amount.

DESCRIPTION OF DRAWINGS

FIGS. 1 and 2 are diagrams illustrating examples in which a cigarette is inserted into an aerosol-generating device.

FIGS. 3 and 4 are diagrams illustrating examples of cigarettes.

FIG. 5 is an internal block diagram of an aerosol-generating apparatus according to an embodiment of the present invention.

FIG. 6 is a graph for explaining a preheating method of an aerosol-generating device according to a first embodiment of the present invention.

FIG. 7 is a graph for explaining a preheating method of an aerosol-generating device according to a second embodiment of the present invention.

FIG. 8 is a graph for explaining a preheating method of an aerosol-generating device according to a third embodiment of the present invention.

FIG. 9 is a flowchart illustrating a preheating method of an aerosol-generating device according to an embodiment of the present invention.

BEST MODE

An aerosol-generating device according to an embodiment of the present invention for solving the above technical problem may include a first heater configured to heat a first aerosol-generating substrate such that a first aerosol is generated at a first vaporization temperature; a second heater configured to heat a second aerosol-generating substrate such that a second aerosol is generated at a second vaporization temperature; a battery configured to supply power to the first heater and the second heater; and a controller configured to control power supplied to the first heater and the second heater such that the first and second heaters are preheated in a preheating section and the first heater is maintained at a preset temperature in a smoking section, wherein the controller starts preheating of the second heater after preheating of the first heater starts and before preheating of the first heater is completed in the preheating section.

In addition, the controller may supply first power to the second heater for a first time period starting from a first time point before the preheating of the first heater is completed.

In addition, the controller may supply second power smaller than the first power to the second heater for a second time period starting from a second time point, which is a time point at which the first time has elapsed from the first time point.

In addition, the controller may increase a temperature of the first heater to a first preheating temperature in the preheating section, increase a temperature of the second heater to a second preheating temperature in the preheating section, and then decrease the temperature of the second heater to a third preheating temperature lower than the second preheating temperature.

In addition, the first preheating temperature may be equal to or higher than the first vaporization temperature, and the third preheating temperature may be lower than the second vaporization temperature.

In addition, the aerosol-generating device may further include a substrate sensor unit configured to sense the presence of the first aerosol-generating substrate, wherein the controller may control the aerosol-generating device to enter the preheating section when the substrate sensor unit senses the presence of the first aerosol-generating substrate.

In addition, the aerosol-generating device may further include an input unit configured to receive a user input, wherein the controller may control the aerosol-generating device to enter the preheating section when the input unit receives the user input.

In addition, the aerosol-generating device may further include a puff sensor unit configured to sense a user's puff, wherein the controller may heat the second heater to a first heating temperature equal to or higher than the second vaporization temperature when the user's puff ends or when a preset sensing time elapses after the user's puff is sensed.

In addition, the controller may reduce the temperature of the second heater to a second heating temperature lower than the second vaporization temperature when a preset sensing time has elapsed after the user's puff ends or the user's puff is sensed.

In addition, the controller may control the temperature of the second heater to be maintained at the second heating temperature even when the user's puff is sensed during a preset idle time after reducing the temperature of the second heater from the first heating temperature to the second heating temperature.

In addition, the first aerosol-generating substrate is a solid substrate, and the second aerosol-generating substrate is a liquid substrate.

An aerosol generating device according to another embodiment of the present invention for solving the above technical problem may include entering a preheating section for increasing temperatures of the first heater and the second heater, wherein the first heater is configured to heat a first aerosol-generating substrate such that a first aerosol is generated at a first vaporization temperature, and the second heater is configured to heat a second aerosol-generating substrate such that a second aerosol is generated at a second vaporization temperature; preheating the first heater in the preheating section; and starting preheating of the second heater after preheating of the first heater starts and before the preheating of the first heater is completed, in the preheating section.

In addition, the starting of preheating of the second heater may include supplying first power to the second heater for a first time period starting from a first time point before the preheating of the first heater is completed; and supplying second power smaller than the first power to the second heater for a second time period starting from a second time point, which is a time point at which the first time elapses from the first time point.

In addition, the preheating of the first heater may include increasing the temperature of the first heater to a first preheating temperature equal to or higher than the first vaporization temperature, and the starting of preheating of the second heater may include increasing the temperature of the second heater to a second preheating temperature equal to or higher than the second vaporization temperature, and then reducing the temperature of the second heater to a third preheating temperature lower than the second vaporization temperature.

In addition, the entering of the preheating section may include entering the preheating section when at least one condition of presence of the first aerosol-generating substrate and reception of a user input is satisfied.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

FIGS. 1 through 2 are diagrams showing examples in which a cigarette is inserted into an aerosol generating device.

Referring to FIGS. 1 and 2, the aerosol generating device 1 may include a battery 11, a controller 12, a heater 13 and a vaporizer 14. Also, the cigarette 2 may be inserted into an inner space of the aerosol generating device 1.

FIGS. 1 through 2 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 2.

Also, FIGS. 1 and 2 illustrate that the aerosol generating device 1 includes the heater 13. However, according to necessity, the heater 13 may be omitted.

FIG. 1 illustrates that the battery 11, the controller 12, the vaporizer 14, and the heater 13 are arranged in series. Also, FIG. illustrates that the vaporizer 14 and the heater 13 are arranged in parallel. However, the internal structure of the aerosol generating device 1 is not limited to the structures illustrated in FIGS. 1 through 32 In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol from the cigarette 2 and/or the vaporizer 14. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 2 and may include various shapes.

The vaporizer 14 may generate an aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Vitamin mixtures may be a mixture of at least one of vitamin A, vitamin B, vitamin C, and vitamin E, but are not limited thereto.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 through 2, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol-generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, the opening and closing and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

Hereinafter, an example of the cigarette 2 will be described with reference to FIG. 3 and FIG. 4.

FIG. 3 and FIG. 4 illustrates an example of a cigarette.

Referring to FIG. 3, the cigarette 2 may include a tobacco rod 21 and a filter rod 22. The first portion 21 described above with reference to FIGS. 1 through 2 may include the tobacco rod, and the second portion may include the filter rod 22.

FIG. 3 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, according to necessity, the filter rod 22 may further include at least one segment configured to perform other functions.

The cigarette 2000 may be packaged by at least one wrapper 24. The wrapper 24 may have at least one hole through which external air may be introduced or internal air may be discharged. For example, the cigarette 2 may be packaged by one wrapper 24. As another example, the cigarette 2 may be double-packaged by at least two wrappers 24. For example, the tobacco rod 21 may be packaged by a first wrapper 241, and the filter rod 22 may be packaged by wrappers 242, 243, 244. Then, the entire cigarette 2 may be packaged by another wrapper 245. When the filter rod 22 includes a plurality of segments, each segment may be packaged by a separate wrapper 242, 243, 244.

The tobacco rod 21 may include an aerosol generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 4, the cigarette 3 may further include a front-end plug 33. The front-end plug 33 may be located on a side of the tobacco rod 42, the side not facing the filter rod 32. The front-end plug 33 may prevent the tobacco rod 31 from being detached and prevent a liquefied aerosol from flowing into the aerosol generating device 1 (FIGS. 1 through 3) from the tobacco rod 31, during smoking.

The filter rod 32 may include a first segment 321 and second segment 322. Here, the first segment 321 can correspond to a first segment of a filter rod 22 of FIG. 3, and the second segment 322 can correspond to a third segment of a filter rod 22 of FIG. 3.

The diameter and total length of the cigarette 3 can correspond to the diameter and total length of the cigarette 2 of FIG. 4. For example, the length of the front-end plug 33 may be about 7 mm, the length of the tobacco rod 31 may be about 15 mm, the length of the first segment 321 may be about 12 mm, and the length of the second segment 322 may be about 14 mm, but it is not limited to this.

The cigarette 3 may be packaged by at least one wrapper 35. The wrapper 35 may have at least one hole through which external air may be introduced or internal air may be discharged. For example, the front-end plug 33 may be packaged by a first wrapper 351, and the tobacco rod 31 may be packaged by a second wrapper 352, and the first segment 321 may be packaged by a third wrapper 321, and the second segment 322 may be packaged by a fourth wrapper 354. Also, the entire cigarette 3 may be packaged by a fifth wrapper 355.

Also, the fifth wrapper 355 may have at least one hole 36. For example, the hole 36 may be formed in an area surrounding the tobacco rod 31, but is not limited thereto. The hole 36 may serve to transfer heat formed by the heater 13 shown in FIG. 2 and FIG. 3 to the inside of the tobacco rod 31.

Also, the second segment 322 may include at least one capsule 34. Here, the capsule 34 may generate a flavor or an aerosol. For example, the capsule 34 may have a configuration in which a liquid containing a flavoring material is wrapped with a film. For example, the capsule 34 may have a spherical or cylindrical shape, but is not limited thereto.

FIG. 5 is an internal block diagram of an aerosol-generating apparatus according to an embodiment of the present invention.

Referring to the drawings, the aerosol-generating device 1 according to the embodiment of the present invention may include a controller 510, a battery 520, a first heater 530, a second heater 540, a sensor unit 550, an output unit 560, an input unit 570 and a memory 580.

The controller 510 may control all of the battery 520, the first heater 530, the second heater 540, the sensor unit 550, the output unit 560, the input unit 570, and the memory 580 included in the aerosol-generating device 1.

The battery 520 supplies power to the first heater 530 and the second heater 540, and the amount of power supplied to the first heater 530 and the second heater 540 may be controlled by the controller 510.

The first heater 530 may generate a first aerosol at a first vaporization temperature by heating a first aerosol-generating substrate. When a current is applied to the first heater 530, heat is generated by the specific resistance, and when the first aerosol-generating substrate is heated by the heated first heater 530, an aerosol may be generated.

The first heater 530 may be a component corresponding to the heater 13 of FIGS. 1 to 2. In addition, the first aerosol-generating substrate may be the cigarette 2 of FIGS. 1 to 2. The first aerosol-generating-substrate may be a solid substrate including nicotine.

The second heater 540 may generate a second aerosol at a second vaporization temperature by heating a second aerosol-generating substrate. The second heater 540 may correspond to a heating element provided in the vaporizer 14 of FIGS. 1 and 2. In addition, the second aerosol-generating substrate may be a liquid composition stored in the liquid storage unit of FIGS. 1 and 2. The second aerosol-generating substrate may be a liquid substrate including an aerosol-forming agent.

The second heater 540 may generate the second aerosol by heating the second aerosol-generating substrate, and the generated second aerosol may pass through the first aerosol-generating substrate and be delivered to a user together with the first aerosol.

The controller 510 may control power supplied to the first heater 530 and the second heater 540. The controller 510 may control the battery 520 to adjust power supplied to the first heater 530 and the second heater 540.

The controller 510 may control power supplied to the first heater 530 and the second heater 540 through a pulse width modulation (PWM) method. To do so, the controller 510 may include a pulse width modulation module.

The controller 510 may heat the first heater 530 and the second heater 540 by controlling power supplied to the first heater 530 and the second heater 540.

In detail, the controller 510 may start preheating of the second heater 540 at a first time point before the preheating of the first heater 530 is completed, and may supply predetermined power to the second heater 540 for a first time period. For example, if a preheating time of the first heater 530 is 30 seconds, the controller 510 may start preheating the second heater 540 from 27 second on the time line, which is 3 seconds before the preheating of the first heater 530 is completed, and supply predetermined power to the first heater 530 for the next 1 second.

The controller 510 may control the temperature of the first heater 530 and the second heater 540 by controlling the power supplied to the first heater 530 and the second heater 540 according to the preheating section and the smoking section described later.

In the preheating section, the controller 510 may heat the first heater 530 at or higher than a first vaporization temperature at which the first aerosol is generated, and may heat the second heater 540 up to a temperature which is close to but lower than a second vaporization temperature at which the second aerosol is generated.

In more detail, the controller 510 may heat the first heater 530 to a first temperature at which the first aerosol is generated at the time of completion of preheating. The first temperature may be set in consideration of the vaporization temperature of the first aerosol-generating substrate. For example, the first temperature may be in the range of 240° C. to 250° C.

The controller 510 may heat the second heater 540 to a second temperature at which the second aerosol is not generated when preheating is completed. The second temperature may be set in consideration of the vaporization temperature of the second aerosol-generating substrate. For example, the vaporization temperature of the second aerosol-generating substrate may be 210° C. and the second temperature may be in the range of 200° C. to 205° C.

The reason for preheating the temperature of the second heater 540 to a temperature which is slightly lower than the second vaporization temperature at which the second aerosol is generated is to prevent the second aerosol-generating substrate, which is installed to increase the amount of atomization of the aerosol-generating device 1, from generating the second aerosol regardless of a user's puff, and to quickly heat the second aerosol-generating substrate in response to the user's puff.

The controller 510 may preheat the first heater 530 for a preset preheating time. Hereinafter, the preheating section and the preheating time of the first heater 530 may have the same meaning. Depending on the embodiment, the controller 510 may include a timer for counting the preheating time.

The preheating time of the first heater 530 may be set in consideration of a time required for the first heater 530 to reach a temperature at which the first aerosol is generated. The preheating time of the first heater 530 may be appropriately set according to a heating performance of the first heater 530 and components of the first aerosol-generating substrate. For example, the preheating time of the first heater 530 may be 30 seconds.

The controller 510 may preheat the second heater 540 based on the preheating time of the first heater 530.

The controller 510 may start preheating of the second heater 540 before the preheating of the first heater 530 is completed. Because the second heater 540 generates a second aerosol by heating the liquid composition absorbed by a liquid delivery means such as a wick, the second heater does not need to be heated from the start of the preheating section, unlike the first heater 530 that generates the first aerosol by heating a solid substrate such as a cigarette. Accordingly, the controller 510 may start preheating at a predetermined time before the preheating of the first heater 530 is completed.

Once preheating of the second heater 540 has been started, even if the user's puff is detected, the controller 510 may not supply additional power to the second heater 540 in addition to the power for preheating the second heater 540. This is to prevent coil carbonization due to overheating of the second heater 540.

The sensor unit 550 may include a substrate sensor unit 551, a puff sensor unit 553, and a temperature sensor unit 555.

The substrate sensor unit 551 may detect whether the first aerosol-generating substrate is present. To do so, the substrate sensor unit may include at least one cigarette sensor. When the first aerosol-generating substrate is the cigarette 2 of FIGS. 1 and 2, the substrate sensor unit 551 may be installed in a cigarette insertion port (not shown) to detect whether the cigarette 2 is present. Therefore, the substrate sensor unit 551 may be referred to as a cigarette sensor unit.

When the substrate sensor unit 551 detects the first aerosol-generating substrate, a substrate sensing signal may be transmitted to the controller 510. On receiving the substrate sensing signal, the controller 510 may start preheating the first heater 530. In addition, the controller 510 may start preheating the second heater 540 based on the preheating time of the first heater 530.

The puff sensor unit 553 may detect a user's puff. To do so, the puff sensor unit 553 may include at least one pressure sensor.

When the pressure inside the aerosol-generating device 1 is less than or equal to the reference pressure, the puff sensor unit 553 may transmit a puff sensing signal to the controller 510. The controller 510 may heat the second heater 540 in response to the puff sensing signal.

The temperature sensor unit 555 may be installed on the first heater 530 and the second heater 540, and may sense the temperature of the first heater 530 and the second heater 540. To do so, the temperature sensor unit 555 may include a temperature sensor. For example, the temperature sensor unit 555 may sense a change in thermal resistance of the first heater 530 and the second heater 540.

The temperature senor 555 may transmit a temperature sensing signal to the controller 510. The controller 510 may identify the temperatures of the first heater 530 and the second heater 540 based on the temperature sensing signal. The controller 510 may calculate the heating timing, heating duration, and power for the first heater 530 and the second heater 540, based on the temperatures of the first heater 530 and the second heater 540.

The output unit 560 may output visual information and/or tactile information related to the aerosol-generating device 1.

The input unit 570 may receive a user input. For example, the input unit 570 may be provided in the form of a push button.

The input unit 570 may receive on/off commands of the aerosol-generating device 1. On receiving an operation command of the aerosol-generating device 1, the input unit 570 may transmit a control signal corresponding to the operation command to the controller 510. On receiving the control signal, the controller 510 may start preheating the first heater 530. Also, the controller 510 may preheat the second heater 540 based on the preheating time of the first heater 530.

The memory 580 may store information for the operation of the aerosol-generating device 1. For example, the memory 580 may store a temperature profile for the controller 510 to control the power supplied to the first heater 530 and the second heater 540 such that the aerosol-generating device 1 provides various tastes of the aerosol to a user. The temperature profile may include information such as a preheating timing, a preheating duration, and a preheating temperature of the first heater 530 and the second heater 540.

FIG. 6 is a graph for explaining a preheating method of an aerosol-generating device according to a first embodiment of the present invention.

Referring to FIG. 6, the graph shows the temperature 610 of the first heater 530 and the temperature 630 of the second heater 540, according to an embodiment.

When the input unit 570 receives a user's operation command and/or when the substrate sensor unit 551 senses the first aerosol-generating substrate, the controller 510 may control the aerosol-generating device 1 to enter the preheating section and start preheating of the first heater 530.

In detail, when the input unit 570 receives a user's operation command and/or when the substrate sensor unit 551 senses the first aerosol-generating substrate, the controller 510 may start preheating of the first heater 530. The controller 510 may heat the first heater 530 for a preset preheating time. For example, the preheating time may be 30 seconds. The controller 510 may control the battery 520 to supply power to the first heater 530 for a preset preheating time.

The control unit 510 may increase the temperature of the first heater 530 to a first preheating temperature Tp1 in the preheating section. The first preheating temperature Tp1 may be higher than or equal to a first vaporization temperature at which the first aerosol is generated. For example, the first preheating temperature Tp1 may be 240° C., which is the first vaporization temperature. Accordingly, the aerosol-generating device 1 may provide a user with a rich smoking taste from the beginning of the smoking section.

The controller 510 may calculate a preheat start timing of the second heater 540 based on the preheat time of the first heater 530. The controller 510 may start preheating of the second heater 540 at a predetermined time before the preheating of the first heater 530 is completed. The reason why the controller 510 does not heat the second heater 540 at the same time at the start of the preheating section is that, compared to the first heater 530 that heats a solid substrate such as a cigarette, the second heater 540 heats the liquid composition absorbed in the wick which quickly reaches a target preheating temperature.

In detail, the controller 510 may start preheating of the second heater 540 at a first time point p1 before the preheating of the first heater 530 is completed at a time point p3. The controller 510 may supply first power to the second heater 540 for a first time t1 from the time point p1 which is the start time of preheating of the second heater 540. For example, when the preheating time of the first heater 530 is 30 seconds, the controller 510 may start preheating of the second heater 540 at 27 second on the timeline, which is 3 seconds before the preheating of the first heater 530 is completed at the third time point p3. Also, for example, the controller 510 may supply the first power to the second heater 540 for the next 1 second (i.e., the first time t1 may be 1 second).

As the controller 510 supplies the first power to the second heater 540 for the first time t1, the temperature 630 of the second heater 540 may increase to the second preheating temperature Tp2 at a second time point p2 (i.e., when the first time t1 has passed from the first time point p1). In other words, the controller 510 may start preheating the second heater 540 at the first time point p1 and increase the temperature 630 of the second heater 540 to the second preheating temperature Tp2 at the second time point p2. The second preheating temperature Tp2 may be greater than the second vaporization temperature at which the second aerosol is generated. For example, the second preheating temperature Tp2 may be 280° C.

The controller 510 may supply second power less than the first power to the second heater 540 for a second time t2 between the second time point p2 (i.e., when the first time t1 has passed from the first time point p1) and the third time point p3 at which the preheating section ends. For example, assuming that the preheating time of the first heater 530 is 30 seconds and the controller 510 heats the second heater 540 for 1 second starting from 27 second on the time line, the controller 510 may supply second power smaller than the first power to the second heater 540 from 28 second to 30 second on the timeline.

As the controller 510 supplies the second power to the second heater 540 for the second time t2, the temperature of the second heater 540 may be reduced to a third preheating temperature Tp3 lower than the second preheating temperature Tp2 at a third time point p3 which is a time point when the preheating ends (i.e., when the second time t2 has passed from the second time point p2). In other words, the controller 510 may reduce the temperature 630 of the second heater 540 to the third preheating temperature Tp3 lower than the second preheating temperature Tp2 by controlling the power supplied to the second heater 540 at the second time point p2. The third preheating temperature Tp3 is lower than the second vaporization temperature at which the second aerosol is generated, but may be a temperature close to the second vaporization temperature. For example, the second vaporization temperature of the second aerosol-generating substrate may be 210° C., and the third preheating temperature Tp3 may be 205° C.

The reason for preheating the temperature of the second heater 540 to a temperature close to but lower than the second vaporization temperature at which the second aerosol is generated is to prevent the second aerosol-generating substrate, which is installed to increase the amount of atomization, from generating the second aerosol regardless of the user's puff, and to rapidly heat the second aerosol-generating substrate in response to the user's puff.

After the second time point p2, the controller 510 may not supply additional power to the second heater 540 for the second time t2 even when a puff of the user is sensed. This is to prevent coil carbonization due to overheating of the second heater 540. For example, the second time t2 may be 2 seconds.

As described above, according to an embodiment, by separately providing a preheating section before the smoking section, it is possible to reduce the liquid viscosity immediately before the smoking section to a level at which vaporization may quickly occur. Accordingly, there is an advantage that the amount of atomization at the beginning of smoking may be remarkably increased by increasing the moving speed of the liquid composition through the wick. As such, user satisfaction may be increased.

As described above, in the first embodiment of the present invention, unlike the second and third embodiments to be described later, the second heater 540 may be rapidly heated to the second preheating temperature Tp2 and then reduced to the third preheating temperature Tp3 which is a temperature close to but lower than the vaporization temperature of the second aerosol-generating substrate. This has the advantage of rapidly preheating the second heater 540 to a temperature close to the vaporization temperature of the second aerosol-generating substrate and reducing power consumption of the aerosol-generating device 1.

Meanwhile, in the smoking section (i.e., after the third time point p3), the controller 510 may maintain the temperature 610 of the first heater 530 equal or higher than the first vaporization temperature at which the first aerosol is generated, and heat the second heater 540 in response to the user's puff.

In detail, the controller 510 may control the temperature 610 of the first heater 530 to be maintained at the first preheating temperature Tp1 in the smoking section. For example, the controller 510 may control the temperature 610 of the first heater 530 through a proportional integral difference (PID) control method, but the present invention is not limited thereto.

The controller 510 may increase the temperature 630 of the second heater 540 when the puff sensor unit 553 senses a user's puff while the second heater 540 is at a third preheating temperature Tp3 and the second aerosol is not generated.

The controller 510 may supply a third power less than the first power but greater than the second power to the second heater 540 for the third time t3 from the fourth time point p4, which is the user's puff start time. Also, the controller 510 may maintain supply of the third power for the fourth time t4. The sum of the third time t3 and the fourth time t4 may be greater than the first time t1. This is to ensure a sufficient amount of atomization when the user puffs. For example, the sum of the third time t3 and the fourth time t4 may be 2 seconds.

As the controller 510 supplies third power to the second heater 540, when the third time t3 has passed from the fourth time point p4, the temperature of the second heater 540 may be increased to a preset first heating temperature Th1 which is greater than or equal to the second vaporization temperature at which the second aerosol is generated. Also, the first heating temperature Th1 of the second heater 540 may be maintained for a fourth time t4. As the first heating temperature Th1 is maintained for the fourth time t4, a sufficient amount of atomization may be generated when the user puffs.

The controller 510 may supply second power to the second heater 540 for a fifth time t5 after the fourth time t4 expires. As the controller 510 supplies the second power for the fifth time t5, the temperature of the second heater 540 may be reduced to the second heating temperature Th2. As shown in FIG. 6, the second heating temperature Th2 may be the same as the third preheating temperature Tp3. By setting the second heating temperature Th2 in the smoking section to be the same as the third preheating temperature Tp3 in the preheating section, convenience of control may be improved.

On the other hand, when the temperature of the second heater 540 is reduced from the first heating temperature Th1 to the second heating temperature Th2 (i.e., Tp3), the controller 510 may control the temperature 630 of the second heater 540 to be maintained at the second heating temperature Th2 during a preset idle time, even when the puff sensor unit 553 senses the user's puff. In FIG. 6, the idle time may be a fifth time t5. The fifth time t5 may be less than the second time t2. For example, the idle time may be 1 second. This is to prevent coil carbonization due to overheating of the second heater 540.

FIG. 7 is a graph for explaining a preheating method of an aerosol-generating device according to a second embodiment of the present invention.

The difference from FIG. 6 is that the temperature 730 of the second heater 540 is gradually increased to a target preheating temperature in the preheating section.

Referring to FIG. 6, the controller 510 may start preheating of the second heater 540 at a first time point p1 before preheating of the first heater 530 is completed. The controller 510 may supply the fourth power to the second heater 540 for the first time t1 after starting preheating of the second heater 540. The first time t1 of FIG. 7 may be greater than the first time t1 of FIG. 6. For example, when the preheating time of the first heater 530 is 30 seconds, the controller 510 may start preheating of the second heater 540 at 10 second on the timeline, which is 20 seconds before the completion of preheating of the first heater 530, and may supply fourth power to the second heater 540 for the next 18 seconds.

As the controller 510 supplies the fourth power to the second heater 540 for the first time t1, the temperature 730 of the second heater 540 may increase to a fourth preheating temperature Tp4 at a second time point p2 (i.e., when the first time t1 has passed from the first time point P1). In other words, the controller 510 may start preheating of the second heater 540 at the first time point p1, and increase the temperature 730 of the second heater 540 to the fourth preheating temperature Tp4 at the second time point p2. The fourth preheating temperature Tp4 of FIG. 7 may be the same as the third preheating temperature Tp3 of FIG. 6. Also, the fourth preheating temperature Tp4 may be slightly lower than the second vaporization temperature at which the second aerosol is generated. For example, the second vaporization temperature of the second aerosol-generating substrate may be 210° C., and the fourth preheating temperature Tp4 may be 205° C.

The controller 510 may control the temperature 730 of the second heater 540 to be maintained at the fourth preheating temperature Tp4 for the second time t2 which is between the second time point p2 (i.e., when the first time t1 has passed from the first time point p1) and the third time point p3 at which the preheating section ends. For example, assuming that the preheating time of the first heater 530 is 30 seconds and the controller 510 heats the second heater 540 for 18 seconds starting from 10 second on the timeline, the controller 510 may maintain the temperature 730 of the second heater 540 at the fourth preheating temperature Tp4 from 28 second to 30 second on the timeline.

After the second time point p2, the controller 510 does not supply additional power to the second heater 540 for the second time t2 to maintain the temperature 730, even when a puff of the user is sensed. This is to prevent coil carbonization due to overheating of the second heater 540 as in FIG. 6. For example, the second time t2 may be 2 seconds.

The preheating method of the aerosol-generating device 1 according to the second embodiment of the present invention may prevent the durability of the second heater 540 from being degraded due to rapid heating, by starting the preheating of the second heater 540 earlier than the first embodiment and gradually increasing the temperature 730 of the second heater 540.

FIG. 8 is a graph for explaining a preheating method of an aerosol-generating device according to a third embodiment of the present invention.

The difference from FIGS. 6 and 7 is that the temperature of the second heater 540 is increased in a stepwise manner to a target preheating temperature in the preheating section.

Referring to FIG. 8, the controller 510 may start preheating of the second heater 540 at a first time point p1 before preheating of the first heater 530 is completed at a time point p3. The controller 510 may gradually increase the power supplied to the second heater 540 step by step for the first time t1, after preheating the second heater 540 is started at the first time point p1. The first time t1 of FIG. 8 may be greater than the first time t1 of FIG. 6 and less than the first time t1 of FIG. 7. For example, assuming that the preheating time of the first heater 530 is 30 seconds, the controller 510 may start preheating the second heater 540 at 13 second on the timeline, which is 17 seconds before the preheating of the first heater 530 is completed, and increase the power supplied to the second heater 540 step by step for the next 15 seconds.

The controller 510 may supply a fifth power to the second heater 540 for a fifth time t5 after preheating of the second heater 540 is started at the first time point p1. For example, the fifth time t5 may be 1 second. As will be described later, by setting the initial heating time to be short, the second heater 540 may quickly reach the preheating temperature of the second aerosol-generating substrate.

As the controller 510 supplies the fifth power to the second heater 540 for the fifth time t5, the temperature 830 of the second heater 540 may increase to the fifth preheating temperature Tp5.

The controller 510 may prevent a rapid temperature change of the second heater 540 by maintaining the temperature 830 of the second heater 540 at the fifth preheating temperature Tp5 for a sixth time t6 after the fifth time t5 expires.

Similarly, the controller 510 may supply a sixth power to the second heater 540 for a seventh time t7 to increase the temperature 830 of the second heater 540 to a sixth preheating temperature Tp6, and may maintain the temperature 830 of the second heater 540 at the sixth preheating temperature Tp6 for the eighth time t8 after the seventh time t7 expires.

Also, the controller 510 may increase the temperature 830 of the second heater 540 to a seventh preheating temperature Tp7 by supplying a seventh power to the second heater 540 for a ninth time t9. The seventh preheating temperature Tp7 may be the same as the third preheating temperature Tp3 of FIG. 6. The seventh preheating temperature Tp7 may be slightly lower than the second vaporization temperature at which the second aerosol is generated. For example, the vaporization temperature of the second aerosol-generating substrate may be 210° C., and the seventh preheating temperature Tp7 may be 205° C.

The controller 510 may maintain the temperature 830 of the second heater 540 at the seventh preheating temperature Tp7 for a second time t2 between the second time point p2 (i.e., when the first time t1 has passed from the first time point p1) and the third time point p3 (i.e., when the preheating section terminates). For example, assuming that the preheating time of the first heater 530 is 30 seconds and the controller 510 heats the second heater 540 for 15 seconds starting from 13 second on the timeline, the controller 510 may maintain the temperature 830 of the second heater 540 at the seventh preheating temperature Tp7 from 28 second to 30 second on the timeline.

As shown in FIGS. 6 to 7, in order to prevent coil carbonization due to overheating of the second heater 540, the controller 510 may not supply additional power to the second heater 540 for the second time T2 such that the temperature 830 of the second heater 540 is maintained at the seventh preheating temperature Tp7, even when a puff of the user is sensed.

The preheating method of the aerosol-generating device 1 according to the third embodiment of the present invention may prevent the durability of the second heater 540 from being degraded due to rapid heating, by starting the preheating of the second heater 540 earlier than the first embodiment and gradually increasing the temperature 830 of the second heater 540 step by step.

In addition, the preheating method of the aerosol-generating device 1 according to the third embodiment provides an advantage in terms of power consumption by starting the preheating of the second heater 540 later than the second embodiment.

FIG. 9 is a flowchart illustrating a preheating method of an aerosol-generating device according to an embodiment of the present invention.

Referring to the FIG. 9, when the input unit 570 receives a user's operation command and/or when the substrate sensor unit 551 senses a first aerosol-generating substrate, the controller 510 may control the aerosol-generating device to enter the preheating section (S910).

The controller 510 may start preheating of the first heater 530 in the preheating section (S920). As described above with reference to FIGS. 6-8, the controller 510 may increase the temperature of the first heater 530 to the first preheating temperature Tp1 in the preheating section. The first preheating temperature Tp1 may be higher than or equal to the first vaporization temperature at which the first aerosol is generated. Accordingly, the present invention may provide a user with a rich smoking taste from the beginning of the smoking section.

The controller 510 may start preheating of the second heater 540 before the preheating of the first heater 530 is completed (S930). The controller 510 may heat the second heater 540 to a target preheating temperature at which the second aerosol is not yet generated.

In more detail, the controller 510 may calculate a preheat start time of the second heater 540 based on the preheat time of the first heater 530. As described above with reference to FIGS. 6-8, the controller 510 may start preheating of the second heater 540 at a first time point p1 before the preheating of the first heater is completed.

The controller 510 may supply a predetermined power to the second heater 540 during the preheating period after preheating the second heater 540 is started.

According to the first embodiment shown in FIG. 6, the controller 510 may supply the first power to the second heater 540 for a first time t1 after preheating the second heater 540 is started at a time point p1.

As the first power is supplied to the second heater 540 for the first time t1, the temperature 630 of the second heater 540 may increase to the second preheating temperature Tp2 at a second time point p2 (i.e., when the first time t1 has passed from the first time point p1). The second preheating temperature Tp2 may be greater than the second vaporization temperature at which the second aerosol is generated.

The controller 510 may supply second power smaller than the first power to the second heater 540 for a second time t2 between the second time point p2 when the first time t1 has passed from the first time point p1 and the time point p3 at which the preheating section ends.

As the controller 510 supplies the second power to the second heater 540 for the second time t2, the temperature 630 of the second heater 540 may be reduced to a third preheating temperature Tp3 lower than the second preheating temperature Tp2 at a third time point p3 (i.e., when the second time t2 has passed from the second time point p2). The third preheating temperature Tp3 may be a target preheating temperature.

According to the second embodiment shown in FIG. 7, the controller 510 may start preheating of the second heater 540 at a time earlier than the start of preheating of the aerosol-generating device 1 according to the first embodiment.

The controller 510 may supply the fourth power to the second heater 540 for the first time t1 after preheating the second heater 540 is started at the time point p1.

As the controller 510 may supply the fourth power to the second heater 540 for the first time t1, the temperature 730 of the second heater 540 may increase to the fourth preheating temperature Tp4 at a second time point p2 at the time point p3 (i.e., when the first time t1 has passed from the first time point p1).

The controller 510 may maintain the temperature 730 of the second heater 540 at the fourth preheating temperature Tp4 for a second time t2 which is between the time point p2 and the third time point p3 at which the preheating section ends. The fourth preheating temperature Tp5 may be a target preheating temperature.

According to the third embodiment shown in FIG. 8, the controller 510 may start preheating of the second heater 540 at a time point earlier than the start of preheating of the aerosol-generating device 1 according to the first embodiment, but at a time point later than the start of preheating of the aerosol-generating device 1 according to the second embodiment.

The controller 510 may gradually increase the power supplied to the second heater 540 step by step for the first time t1 after preheating the second heater 540 is started at the first time point p1.

As the controller 510 gradually increases the power supplied to the second heater 540 step by step for the first time t1, the temperature 830 of the second heater 540 may increase to the seventh preheating temperature Tp7 at a second time point p2 (i.e., when the first time t1 has passed from the first time point p1).

The controller 510 may maintain the temperature 830 of the second heater 540 at the seventh preheating temperature Tp7 for a second time t2 from the second time point p2 to the third time point p3 at which the preheating section ends. The seventh preheating temperature Tp7 may be a target preheating temperature.

The above-described method may be written in a program that may be executed on a computer, and may be implemented in a general-purpose digital computer that operates the program using a computer-readable recording medium. In addition, the structure of the data used in the above-described method may be recorded on a computer-readable recording medium through various means. The computer-readable recording medium includes storage media such as magnetic storage media (e.g., ROM, RAM, USB, floppy disk, hard disk, etc.), optical reading media (e.g., CD-ROM, DVD, etc.).

At least one of the components, elements, modules or units (collectively "components" in this paragraph) represented by a block in the drawings such as the controller 12 and the controller 510 in FIGS. 1-2 and 5, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present invention is shown in the claims rather than the foregoing description, and all differences within the scope equivalent thereto should be construed as being included in the present invention.

The invention claimed is:

1. An aerosol-generating device comprising:

a first heater configured to heat a first aerosol-generating substrate such that a first aerosol is generated at a first vaporization temperature;

a second heater configured to heat a second aerosol-generating substrate distinct from the first aerosol-generating substrate to generate a second aerosol at a second vaporization temperature;

a battery configured to supply power to the first heater and the second heater; and a controller configured to control power supplied to the first heater and the second heater such that the first heater and the second heater are preheated in a preheating section and the first heater is maintained at a preset temperature in a smoking section, wherein the controller starts preheating the second heater after the preheating of the first heater starts and before the preheating of the first heater is completed, in the preheating section.

2. The aerosol-generating device of claim 1, wherein the controller supplies first power to the second heater for a first time period starting from a first time point, before the preheating of the first heater is completed.

3. The aerosol-generating device of claim 2, wherein the controller supplies second power smaller than the first power to the second heater for a second time period starting from a second time point, which is a time point at which the first time period has elapsed from the first time point.

4. The aerosol-generating device of claim 1, wherein the controller is further configured to control a temperature of the first heater to increase to a first preheating temperature in the preheating section, and control a temperature of the second heater to increase to a second preheating temperature and then decrease to a third preheating temperature lower than the second preheating temperature, in the preheating section.

5. The aerosol-generating device of claim 4, wherein the first preheating temperature is equal to or higher than the first vaporization temperature, and the third preheating temperature is lower than the second vaporization temperature.

6. The aerosol-generating device of claim 1, further comprises a substrate sensor unit configured to sense presence of the first aerosol-generating substrate, wherein the controller is configured to control the aerosol-generating device to enter the preheating section based on the substrate sensor unit sensing the presence of the first aerosol-generating substrate.

7. The aerosol-generating device of claim 1, further comprising an input unit configured to receive a user input, wherein the controller is configured to control the aerosol-generating device to enter the preheating section based on the input unit receiving the user input.

8. The aerosol-generating device of claim 1, further comprising a puff sensor unit configured to sense a user's puff, wherein the controller is configured to heat the second heater to a first heating temperature equal to or higher than the second vaporization temperature based on the user's puff being sensed in the smoking section.

9. The aerosol-generating device of claim 8, wherein the controller is configured to reduce the temperature of the second heater to a second heating temperature lower than the second vaporization temperature based on the user's puff ending or a preset sensing time elapsing after the user's puff is sensed.

10. The aerosol-generating device of claim 9, wherein the controller is configured to control the temperature of the second heater to be maintained at the second heating temperature even when the user's puff is sensed, during a preset idle time after the temperature of the second heater is reduced from the first heating temperature to the second heating temperature.

11. The aerosol-generating device of claim 1, wherein the first aerosol-generating substrate is a solid substrate, and the second aerosol-generating substrate is a liquid substrate.

12. A preheating method of an aerosol-generating device, the preheating method comprising:

entering a preheating section for increasing temperatures of a first heater and a second heater, wherein the first heater is configured to heat a first aerosol-generating substrate such that a first aerosol at a first vaporization temperature, and the second heater is configured to heat a second aerosol-generating substrate distinct from the first aerosol-generating substrate to generate a second aerosol at a second vaporization temperature;

preheating the first heater in the preheating section; and starting preheating of the second heater after the preheating of the first heater starts and before the preheating of the first heater is completed, in the preheating section.

13. The preheating method of claim 12, wherein the starting of the preheating of the second heater includes:

supplying first power to the second heater for a first time period starting from a first time point, before the preheating of the first heater is completed; and supplying second power smaller than the first power to the second heater for a second time period starting from a second time point, which is a time point at which the first time period elapses from the first time point.

14. The preheating method of claim 12, wherein the preheating of the first heater includes increasing a temperature of the first heater to a first preheating temperature equal to or higher than the first vaporization temperature, and the starting of the preheating of the second heater includes increasing a temperature of the second heater to a second preheating temperature equal to or higher than the second vaporization temperature, and then reducing the temperature of the second heater to a third preheating temperature lower than the second vaporization temperature.

15. The preheating method of claim 12, wherein the entering of the preheating section includes entering the preheating section based on at least one condition of presence of the first aerosol-generating substrate and reception of a user input being satisfied.

* * * * *